(No Model.)
B. P. FORTIN.
SURFACE GAGE.
No. 508,213. Patented Nov. 7, 1893.
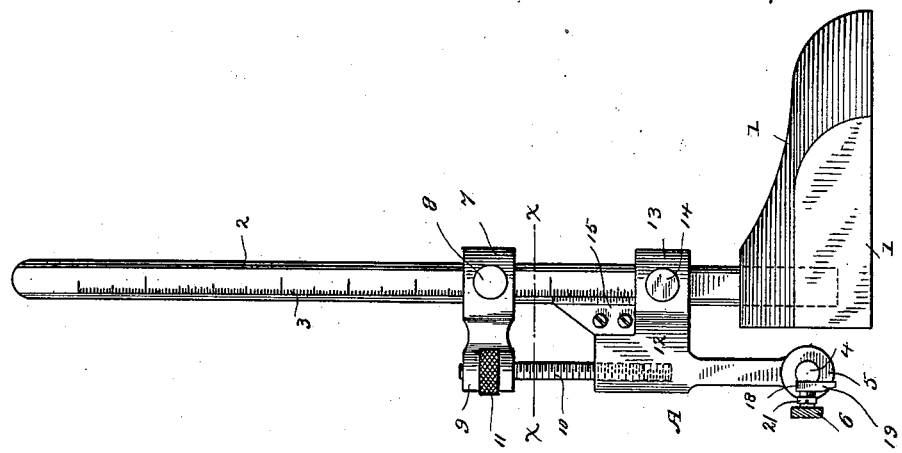
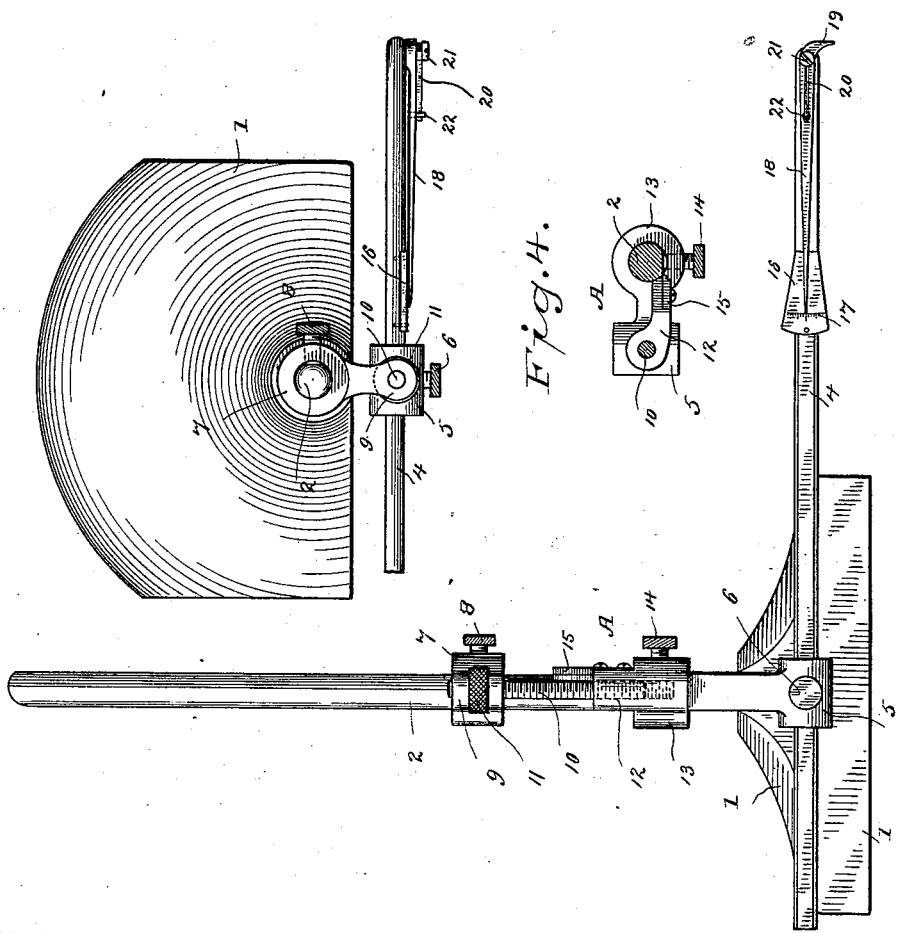
WITNESSES
H. A. Lamb
Pearl Reynolds
INVENTOR
Benjamin P. Fortin
By A. M. Wooster
Atty.
THE NATIONAL LITHOGRAPHING COMPANY.
WASHINGTON, D. C.

UNITED STATES PATENT OFFICE.

BENJAMIN P. FORTIN, OF BRIDGEPORT, CONNECTICUT, ASSIGNOR OF ONE-HALF TO EDWARD J. DAVEY, OF SAME PLACE.

SURFACE-GAGE.

SPECIFICATION forming part of Letters Patent No. 508,213, dated November 7, 1893.

Application filed March 3, 1893. Serial No. 464,551. (No model.)

*To all whom it may concern:*

Be it known that I, BENJAMIN P. FORTIN, a citizen of the United States, residing at Bridgeport, in the county of Fairfield and State of Connecticut, have invented certain new and useful Improvements in Surface-Verniers; and I do hereby declare the following to be a full, clear, and exact description of the invention, such as will enable others skilled in the art to which it appertains to make and use the same.

My invention has for its object to produce an instrument which shall be especially adapted for use in connection with metal planers to indicate when the piece of metal that is being operated upon has been planed down to the proper thickness, it being desirable in an instrument of this class to make the capacity as great as possible, to provide a quick and accurate adjustment to different pieces of work, and furthermore that a scale be provided which shall be graduated so finely as to indicate variation from the required thickness to the minutest fraction of an inch.

With these ends in view I have devised the novel instrument which I will now describe referring by numbers and letters to the accompanying drawings forming part of this specification in which—

Figure 1 is a side elevation of my novel surface vernier; Fig. 2 an end elevation; Fig. 3 a plan view, and Fig. 4 is a section on the line *x x* in Fig. 2 looking down.

1 denotes the base and 2 the standard extending upward therefrom and provided with a flattened side having upon it a scale 3.

A denotes the slide as a whole and 4 the needle rod which is carried thereby. This rod is provided with a flat side and passes through a hub 5 at the lower end of the slide in which it is locked after adjustment by a set screw 6. The upper portion of the slide consists of a hub 7 through which the standard passes and which is locked in position after adjustment by a set screw 8. This hub has formed integral with it a head 9 having a vertical opening through which the upper end of a screw 10 passes loosely, and a transverse slot in which lies a knurled finger piece 11 which is rigidly secured to the screw. This construction permits the finger piece and screw to turn freely in head 9 but retains it against other than rotary movement. The lower portion of the slide consists of a head 12 which has formed integral with it hub 5 which carries the needle rod and also a hub 13 through which the standard passes and to which it is locked by a set screw 14. The threaded lower end of the screw engages head 12. It follows therefore that when the screw is rotated head 9 being locked in position, head 12 and the parts carried thereby will be moved up or down as may be required.

15 is a gage plate which is secured to head 12 and is provided with a scale adapted to register with scale 3.

15 is a plate secured to the needle rod and provided with a scale 17. At the outer end of the rod is pivoted a needle 18 which is provided at its outer end with an angle piece 19 which is the contact point of the instrument with the piece of work upon which it is used.

20 denotes a spring one end of which is coiled about or otherwise attached to the pivot 21 upon which the needle turns, the other end of said spring engaging a pin 22 which extends outward from the needle, the outer end of the pin being preferably split and the spring inserted therein, the object of this spring being to hold the point of the needle at the zero point of scale 17.

In practice I preferably make the distance from the center of pivot 21 to the point of the angle piece and to the point of the needle as 1 to 8, so that any irregularity or extra thickness of the piece of work that is being operated upon sufficient to deflect the angle piece to the slightest extent will produce eight times as great a deflection of the point of the needle. The instrument is thus enabled to measure the most infinitesimal variations in thickness of the piece of work to which it is applied. In use the standard rests upon the bed of the planer.

Suppose that the piece of work being operated upon is required to have an exact thickness of three-fourths of an inch. Set screws 8 and 14 are loosened and the slide is moved by hand until the scale upon plate 16 registers with scale 3 to indicate the required thickness. Set screw 8 is then tightened up. As this adjustment has been merely a hand adjustment it is of course obvious that it is approximate only. Absolutely accurate adjustment is secured by rotation of screw 10 by means of the finger piece thereby raising or lowering hub 13 and the parts carried thereby as may be required, to cause the scale upon plate 15 to register accurately with scale 3 upon the standard. Hub 13 is then locked in position by tightening up set screw 14. The special scale that is used upon plate 15 and the standard is of course not of the essence of my invention. It is common in scales of this class to graduate to twenty-five one thousands of an inch. After the piece of work that is being operated upon has been planed down to approximately the required thickness the instrument is used by swinging the needle arm over the surface of the piece of metal, angle piece 19 being in contact therewith. If the surface of the piece is irregular or if it is too thick the angle piece will of course be raised which will oscillate the needle on its pivot, the point of the needle indicating the superfluous thickness upon scale 17.

Owing to the fact that the point of the needle describes an arc eight times greater than that described by the angle piece it is obvious that this instrument may be made to indicate as infinitesimally fine variations as can possibly be required in the very finest work.

Having thus described my invention, I claim—

1. The combination with the needle arm and suitable means for adjusting said arm vertically, of a needle pivoted to said arm and provided with an angle piece adapted to engage the piece of work upon which the instrument is used, the point of said needle describing a greater arc than that described by the angle piece so that the slightest movement of the angle piece will produce perceptible oscillation of the point of the needle.

2. The combination with the needle arm and suitable means for adjusting said arm vertically, of a needle turning on a pivot 21 on said arm and having a pin 22 and an angle piece adapted to engage the piece of work upon which the instrument is used, and a spring engaging the pivot and pin 22 whereby the needle is held at its normal position until deflected by engagement of the angle piece with the piece of work upon which the instrument is used.

3. The combination with the needle arm having a scale 17 and suitable means for adjusting said arm vertically, of a needle pivoted to said arm and provided with an angle piece adapted to engage the piece of work upon which the instrument is used, and a spring acting to hold the point of the needle at the zero point of the scale until said needle is deflected by oscillation of the angle piece.

4. The combination with the standard and the slide having hub 5, and suitable means for adjusting said slide and locking it in position, of needle rod 4 engaging said hub and provided with a scale, a needle pivoted to said arm and having an angle piece adapted to engage the piece of work upon which the instrument is used, and a spring acting to hold the needle at the zero point of the scale until it is deflected by oscillation of the angle piece.

5. The combination with the needle arm having an angle piece and a spring for holding said needle at its normal position, of the standard having a scale, the slide having a scale adapted to register therewith and suitable means for locking the slide in position after adjustment.

6. The combination with the needle arm, the needle having an angle piece, and a spring for holding the needle at its normal position, of the standard having a scale, and the slide consisting of hub 7 having a head 8, and a set screw for locking said hub in position, hub 13 having a head 12, a hub 5 which carries the needle rod, screw 10 having a finger piece engaging head 9 the threaded portion of said screw engaging head 12 so that said head may be raised or lowered relatively to head 9, and a set screw for locking hub 13 and the parts carried thereby in position after adjustment.

7. The combination with the standard, hubs 7 and 13, and set screws for locking said hubs in position, of head 9 upon hub 7, head 12 and hub 5 carried by hub 13, screw 10 having a finger piece engaging head 9 and rotating therein but held against vertical movement, the lower end of said screw engaging head 12 whereby said head may be adjusted relatively to head 9, needle rod 4 engaging hub 5, a set screw for locking said rod in position, and a needle pivoted to said rod and provided with an angle piece adapted to engage the piece of work upon which the instrument is used.

In testimony whereof I affix my signature in presence of two witnesses.

BENJAMIN P. FORTIN.

Witnesses:
A. M. WOOSTER,
PEARL REYNOLDS.